(12) United States Patent
Hoischen

(10) Patent No.: US 10,012,742 B2
(45) Date of Patent: Jul. 3, 2018

(54) POSITIONING DEVICE FOR RADIOACTIVE RADIATION SOURCES

(71) Applicant: GSI Helmholtzzentrum fuer Schwerionenforschung GmbH, Darmstadt (DE)

(72) Inventor: Robert Hoischen, Lower Hutt (NZ)

(73) Assignee: GSI HELMHOLTZZENTRUM FUER SCHWERIONENFORSCHUNG GMBH, Darmstadt (DE)

( * ) Notice: Subject to any disclaimer, the term of this patent is extended or adjusted under 35 U.S.C. 154(b) by 0 days.

(21) Appl. No.: 15/525,597

(22) PCT Filed: Nov. 4, 2015

(86) PCT No.: PCT/EP2015/075689
§ 371 (c)(1),
(2) Date: May 10, 2017

(87) PCT Pub. No.: WO2016/075008
PCT Pub. Date: May 19, 2016

(65) Prior Publication Data
US 2017/0329026 A1 Nov. 16, 2017

(30) Foreign Application Priority Data
Nov. 11, 2014 (DE) .......................... 10 2014 116 391

(51) Int. Cl.
*G01T 3/00* (2006.01)
*G01T 1/29* (2006.01)

(52) U.S. Cl.
CPC .................................. *G01T 1/2907* (2013.01)

(58) Field of Classification Search
CPC ........... G01T 1/2907; G01T 3/00; G01T 3/08; G01T 1/00; G01T 1/24
See application file for complete search history.

(56) References Cited

U.S. PATENT DOCUMENTS

| 5,274,238 | A  | 12/1993 | Brown |
| 7,994,482 | B2 | 8/2011  | Frank |
| 8,067,742 | B2 | 11/2011 | Winso et al. |
| 2005/0263711 | A1 | 12/2005 | Gerl et al. |
| 2009/0309032 | A1 | 12/2009 | Ramsden et al. |
| 2011/0246137 | A1 | 10/2011 | Vilim et al. |
| 2013/0013280 | A1 | 1/2013  | Kornblau et al. |

FOREIGN PATENT DOCUMENTS

GB 2440588 A 2/2008

*Primary Examiner* — David Porta
*Assistant Examiner* — Faye Boosalis
(74) *Attorney, Agent, or Firm* — Leydig, Voit & Mayer, Ltd.

(57) ABSTRACT

A direction determination device for determining a direction of a source of ionizing radiation relative to the direction determination device includes at least two radiation detection devices with longitudinally designed detection volumes, the at least two radiation detection devices are arranged at an angle relative to one another. A first radiation detection device is designed as a symmetry-maintaining angle-dependent radiation detection device. A second radiation detection device is designed as a symmetry-breaking angle-dependent radiation detection device.

20 Claims, 6 Drawing Sheets

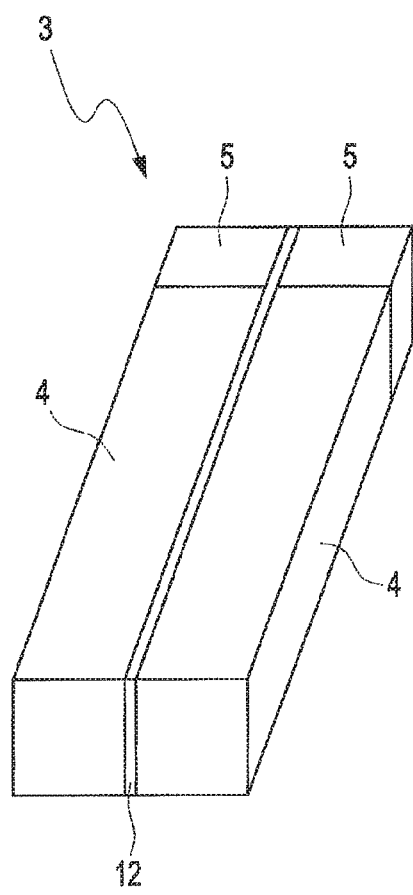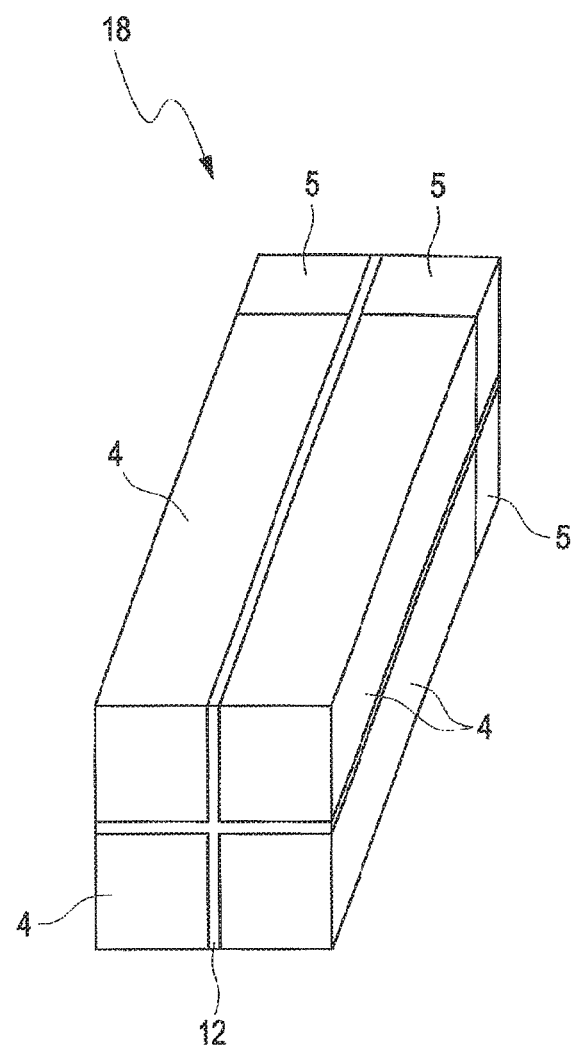
Fig. 3 a                    Fig. 3 b

POSITIONING DEVICE FOR RADIOACTIVE RADIATION SOURCES

CROSS REFERENCE TO RELATED APPLICATIONS

This application is a U.S. National Stage Application under 35 U.S.C. § 371 of International Application No. PCT/EP2015/075689 filed on Nov. 4, 2015, and claims benefit to German Patent Application No. DE 10 2014 116 391.5 filed on Nov. 11, 2014. The International Application was published in German on May 19, 2016 as WO 2016/075008 A2 under PCT Article 21(2).

FIELD

The invention relates to a direction determination device for determining the direction of a radiation source relative to the direction determination device, and in particular to a direction determination device for determining the direction of a source of ionizing radiation relative to the direction determination device. The invention also relates to a method for determining the direction of a radiation source relative to a direction determination device, and in particular to a method for determining the direction of a source of ionizing radiation relative to a direction determination device.

BACKGROUND

Over recent years, there has been an increasing need for devices to not only detect the presence of radioactive sources, but also to establish, as simply and quickly as possible, the direction in which the detected radiation source is located.

Examples of such requirements include dismantling industrial plants in which radioactivity was used, where it is often necessary to inspect an (allegedly) cleared site which is to be released to establish whether all radioactive radiation sources have in fact been removed. If one or more radioactive sources have been left behind, it is of course desirable if these can be located as quickly as possible. This not only increases the speed of the clearance process, but also reduces the radiation exposure of the individuals concerned.

A further area of application relates to the emergency services or helpers (for example, fire brigades) in the event of accidents. In this case too, the aim is not only to detect the presence of radioactive sources, if present, as rapidly as possible, but also to determine their position as quickly as possible. In such applications, particularly rapid detection is often even more important than in the applications described at the outset. In particular, especially swift location of any radioactive sources that may possibly be present may prevent undesirable dispersion of the material in question. Furthermore, the time window for entering the scene of the accident is often particularly short if there is a fire, for example. Another area of application is the regulatory sector, such as in the work of safety authorities (often also referred to as Homeland Security). Rapid detection and identification of any radioactive sources that may be present is also particularly important in this case, as this enables routine screening to take place immediately afterwards.

A detector system was proposed in U.S. Pat. No. 7,994,482 B2 for determining the direction of a gamma and/or a neutron radiation source. A plurality of detector devices are used for this purpose, these being arranged in a cross formation, for example, so that they can measure a large angular range. In this particular device, it is proposed that two detector materials should be sandwiched together back-to-back (in the form of two cuboid detector sets which are in contact with each other via their largest surface) such that it is possible to establish the side from which the ionizing radiation originates from the counting ratio of the two superimposed detector materials. By arranging different detector devices (a pair of detectors, for example) in a cross formation, said pair being arranged at a 90° angle to one another, it is possible to break down the direction of the radiation source to an angle of 90°. Even though the arrangement proposed in the above patent is functional, it has a considerable disadvantage in that it is not possible to measure the direction accurately. A further disadvantage is that the counting rates of the superimposed detector elements must be significantly different from one another. In practice, this is only possible if defined, particularly dense scintillator materials are used or if a shielding layer is arranged between the two detector regions. Both of these solutions lead to disadvantages, such as, for example, restricted usability of scintillator materials or adding an extra weight to the arrangement, which often means that this is no longer suitable for portable applications.

U.S. Pat. No. 8,067,742 B2 describes a further device for determining the position (azimuth angle) of a gamma source. In the device described in this patent, two longitudinal scintillation crystals are arranged at an angle to one another. The light pulses generated by the scintillation crystals as a result of incident gamma radiation are amplified by photodetectors, which are arranged on one side of each scintillation crystal, and the resulting counting rates are evaluated. By comparing the counting rates of the two scintillation detectors (due to the different angular position relative to one another, these scintillation detectors have different counting rates as a function of their orientation relative to the gamma source), it is possible to deduce the direction of the gamma source. Additional scintillation detectors can also be used to further increase accuracy. The US patent specifies an accuracy of up to 5° for the position accuracy of the gamma source. One disadvantage of the set-up described in said patent is that the scintillation crystals used in this case display symmetry for angles offset (in other words, rotated) to the left or to the right (based on a minimum or maximum). As a result, orientation angles can admittedly be determined quite accurately; however, it is not possible to say whether the radiation source is located to the right or to the left (or in front of or behind and/or above or below) the measurement apparatus. This measurement characteristic is disadvantageous, and the resulting disadvantages can go so far as to make the device virtually unusable, at least for many applications. In any event, as a result of the disadvantages (at least with a certain statistical probability), this leads to a significant increase in the measurement time, as it is usually necessary to "simulate" the missing left-right resolution, for example, by other means, such as by increasing or reducing the total counting rate, for example, by moving closer to or further away from the radiation source in question.

SUMMARY

In an embodiment, the present invention provides a direction determination device for determining a direction of a source of ionizing radiation relative to the direction determination device. The direction determination device includes at least two radiation detection devices with longitudinally designed detection volumes, the at least two radiation detection devices are arranged at an angle relative to one another. A first of the radiation detection devices is a symmetry-maintaining angle-dependent radiation detection device. A second of the radiation detection devices is a symmetry-breaking angle-dependent radiation detection device.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIGS. 3a and 3b are a schematic, perspective views of embodiments for symmetry-breaking angle-dependent detectors;

DETAILED DESCRIPTION

Figure 1:
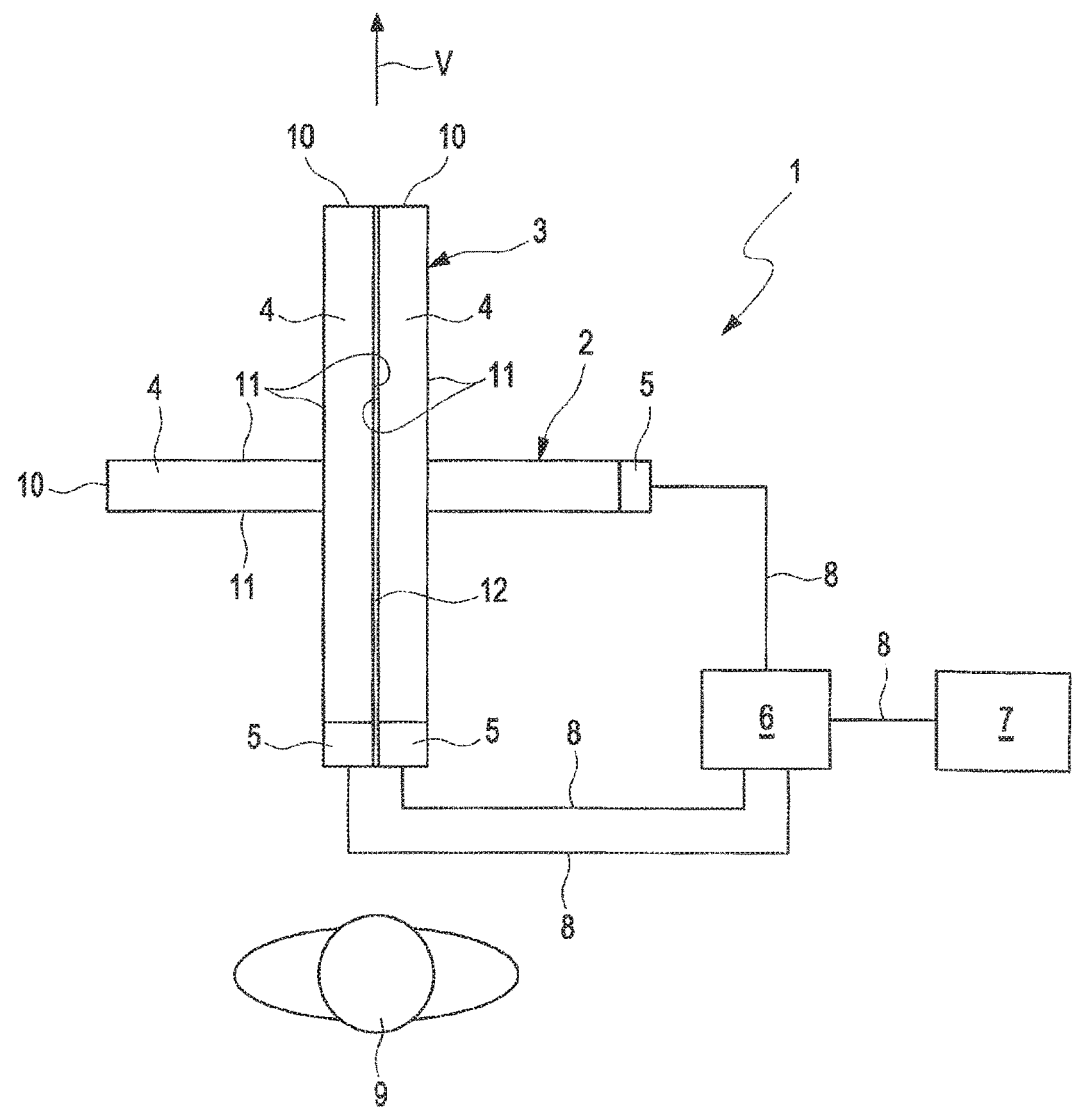
FIG. 1 is a schematic top view of a first embodiment of a direction detector for gamma radiation.

There is a need for improved direction determination devices for determining the direction of a radiation source—in particular a source of ionizing radiation—relative to the direction determination device and for corresponding methods for measuring the direction of a radiation source relative to a direction determination device.

Accordingly, a direction determination device is described herein for determining the direction of a radiation source of ionizing radiation relative to the direction determination device, which is an improvement on the direction determination devices known from the prior art. A method is also described herein for determining the direction of a radiation source of ionizing radiation relative to a direction determination device, which is an improvement on the method known from the prior art for determining the direction of a radiation source of ionizing radiation relative to a direction determination device. A device is described herein that can be lightweight and portable, and a method is described herein that can advantageously be executed with a lightweight and portable device. Furthermore, a device and a method are, respectively, described herein that enable a radiation source to be located accurately and quickly by avoiding initial ambiguities.

According to an embodiment, a direction determination device for determining the direction of a radiation source of ionizing radiation relative to the direction determination device includes at least two radiation detection devices with longitudinally configured detection volumes, in which the at least two radiation detection devices are arranged at an angle relative to each other, in such a way that at least one first radiation detection device is designed as a symmetry-maintaining angle-dependent radiation detection device, and at least one second radiation detection device is designed as a symmetry-breaking angle-dependent radiation detection device. This thus makes it surprisingly simple to, on the one hand, achieve a high angle resolution while simultaneously keeping weight low (and usually also with reduced energy consumption) compared to devices according to the prior art, without incurring disadvantageous effects described in the background with regard to the "ambiguity" associated with a direction (and particularly left-right directions), or in their full extent. It should be noted that a symmetry-maintaining angle-dependent radiation detection device is usually around half the weight of a symmetry-breaking angle-dependent radiation detection device (with substantially the same resolution accuracy). Energy consumption with symmetry-maintaining angle-dependent radiation detection devices is also often only half the energy consumption of symmetry-breaking angle-dependent radiation detection devices (with substantially the same level of accuracy). Accordingly, it is surprisingly simple to achieve an at least considerable reduction in weight and energy consumption with substantially the same spatial resolution by using the device described herein.

It is also possible to further improve the proposed device with a view to significantly increasing the direction accuracy of the direction determination device, for example, without generating unnecessary extra weight or unnecessarily high energy consumption by, for example, providing additional symmetry-maintaining angle-dependent radiation detection devices (with the same number of symmetry-breaking angle-dependent radiation detection devices).

A further possible improvement in the device as a whole in particular entails the possibility of reducing the size and/or energy consumption of the symmetry-breaking angle-dependent radiation detection device(s). This can be achieved by using a "small" symmetry-breaking angle-dependent radiation detection device in which angle dependence is only marked to a relatively minor extent. A "purely" symmetry-breaking radiation detection device is also possible, especially when providing a plurality of or at least two symmetry-maintaining angle-dependent radiation detection devices, without displaying a meaningful angle dependence of the measurement. Embodiments referred to below or already mentioned may be provided in connection with such a device.

A further possible embodiment, which is often particularly useful, entails the symmetry-breaking angle-dependent radiation detection device displaying good results both with regard to symmetry-breaking and angle dependence, although it is still designed to ensure improved energy consumption or improved weight, for example. This is feasible, for example, due to the fact that the symmetry-breaking angle-dependent radiation detection device has detection volumes that have different longitudinal sizes (and where one of the two detection volumes does not even have to be longitudinal in design, in some cases). In other words, one of the detector volumes may have a standard length identical to a symmetry-maintaining angle-dependent radiation detection device, while a duplicate detector volume arranged in parallel has a shorter length, even to the extent that this may be designed as a cuboid, for example.

Within the scope of this application, a longitudinal shape is specifically understood to mean a shape in which the longitudinal extension is greater than the (typical) cross-sectional extension of the shape. Examples of the above include cuboid shapes (with square and/or rectangular cross-sectional surfaces), rod-like shapes (with circular, elliptical, oval or other cross-sectional surfaces) and similar. Of course, shapes with non-homogeneous cross-sectional surfaces are also conceivable. For example, (extended) pyramidal, tetrahedral, rotational-ellipsoidal and similar shapes are conceivable in this connection. Of course, shapes in which chamfers or similar are present on one or both ends are also conceivable (especially with a cross-sectional surface which is substantially identical over the whole length).

The term "symmetry-breaking angle-dependent radiation detection device" as used herein is not meant to be restricted to a number of a corresponding assembly present (one, two, three, etc. assemblies). In particular, the term can also be understood to mean whether it is possible to distinguish side dependence of angle detection ("symmetry-breaking") in a corresponding number of directions (typically at right angles to one another). Thus, for example, it is possible for a specially designed individual assembly of the "symmetry-breaking angle-dependent type" to distinguish, on a symmetry-breaking basis, between two perpendicular directions (for example "front back" and "left right"). It should therefore be possible to regard such an assembly as "a symmetry-breaking angle-dependent radiation detection device" (as there is only one individual corresponding assembly). However, it should also be possible to regard such an assembly as "two symmetry-breaking angle-dependent radiation detection devices", as the assembly is able to distinguish between two perpendicular directions with regard to their orientation (symmetry-breaking) (although there is only one individual assembly). Corresponding generalizations are also possible (for example in the presence of an assembly which is able to distinguish between three perpendicular directions "on the basis of symmetry breaking").

A "symmetry-maintaining angle-dependent" radiation detection device is specifically understood to mean radiation detection devices that do display angle dependence if such devices display angle dependence with respect to their orientation angle relative to the radiation source (at least in some directions), but angle dependence is to a certain extent associated with a specific symmetry (typically resulting in certain ambiguities). If, purely by way of example, a rod-shaped detector is used and the "small" cross-sectional surface is oriented in the direction of a radiation source, the counting rate in the detection volume (which may, for example, be filled with a scintillator material) is minimal. If the detector device is turned away from the minimum position, the counting rate rises until it reaches a maximum when positioned at 90° relative to the radiation source. This thus represents angle dependence. However, the counting rate is (substantially) identical, regardless of the direction of the deflection from the minimum (or from the maximum, accordingly) (at least in some directions). Accordingly, this leads to at least certain symmetries. Therefore, by combining these measurement characteristics in the scope of this application, such detector devices are referred to as symmetry-maintaining angle-dependent radiation detection devices. On the other hand, symmetry-breaking angle-dependent radiation detection devices do not display any symmetries (at least in some directions, or in particular in at least one direction). However, the effects with regard to angle dependence usually correspond to the above-mentioned embodiments (to a certain degree), particularly if their total counting rate is considered. In the scope of the present application, such elements are therefore referred to as "symmetry-breaking angle-dependent radiation detection devices".

As already indicated, the break in symmetry may merely relate to certain directions, such as, for example, a symmetry break (in some cases only in one direction) in a horizontal plane and/or a symmetry break with a rotational movement of the symmetry-breaking angle-dependent radiation detection device to the left or to the right (axis of rotation perpendicular to the ground) or similar. However, symmetries may also exist in other directions, as previously. Remaining with the same example, it is, for example, possible to retain symmetry above or below, as before, although this is "actually" a symmetry-breaking angle-dependent radiation detection device. Although it is also possible to eliminate such ambiguities by designing the symmetry-breaking angle-dependent detection devices accordingly and/or by providing additional symmetry-breaking angle-dependent detection devices, it should be noted that a top/bottom directional symmetry and/or a front/back directional symmetry often does not represent a (significant) disadvantage. If, for example, the intention is to release cleared areas, it is very unlikely that a radioactive radiation source will go unnoticed and be "floating in space" fixed above the ground.

With regard to (the absence of) "front-back" distinguishability, it should be noted that, in many areas of application, measurements are performed from a "clean" area (in other words, not contaminated with radioactivity) into a (potentially) contaminated area. It can therefore be assumed that radiation sources will be located in front of the device "from the outset". Accordingly, this disadvantage is acceptable at least in some areas of application, especially as this may normally be accompanied by a reduction in weight and/or reduced energy consumption by the device, which often more than compensates for the specified disadvantages. Moreover, in this context in particular (distinguishing between front-back), it is also possible to make use of an effect which may arise especially in portable devices (often known amongst specialists as the "interference effect"). This is based on the fact that the individual using the device himself has a certain absorption cross-section with regard to ionizing radiation. Accordingly, there is a certain asymmetry in radiation detection with regard to the front-back direction—and thus a symmetry break, although a separate symmetry-breaking angle-dependent radiation detection device is not provided in this direction. To some extent, it is possible to distinguish between "front-back" by the user "rotating around the vertical axis" and "recording the measurement as a function of the angle" accordingly. In this connection, it should be noted that the "person carrying out the measurement" should not typically be evaluated as a "symmetry-breaking angle-dependent detection device" despite their "directional effect" (even in connection with a "symmetry-maintaining angle-dependent detection device").

It is also proposed that a direction determination device for determining the direction of a radiation source of ionizing radiation relative to the direction determination device can be designed in addition to or as an alternative to the above proposal, said direction determination device comprising at least two radiation detection devices with detection volumes configured longitudinally, at least two radiation detection devices being arranged at an angle to one another, such that at least two radiation detection devices are arranged at variable angles to one another. In particular, it should be possible to design these such that they can be manually and/or automatically adjusted. As a result, it is possible to both adjust the usable field of vision appropriately and adjust the accuracy of direction determination appropriately. It should be noted that increasing the field of vision is typically associated with a reduction in the angle resolution (and vice versa) (at least in simple structures). As a general rule, it is admittedly possible "to achieve both aims, even simultaneously" however, this typically results in a significantly more complex structure, which is often associated with a correspondingly increased weight and increased energy consumption (thus also resulting in increased costs for the device). However, with the proposed angle variation, it is also possible to construct devices with a simple design (which are usually correspondingly lightweight and economical, and consume less energy), which have a large field of vision and also permit accurate direction determination (although admittedly not at the same time). This information should in particular be regarded as relatively accurate information as a function of the various angle positions. If we compare the device proposed here with devices according to the prior art, there is typically a significant increase in accuracy even with "unfavorable angle positions". Thus, for example, it is possible to carry out a "rough scan" of a large angle range in a first measurement, thus obtaining initial information regarding the direction of the radiation source (if one is present). The direction determination device is then realigned using this information, if applicable, and the angle of the radiation detection devices (especially relative to one another) is varied so that significantly higher angle measurement accuracy is (or can be) achieved. Nevertheless, and in particular, a portable version of the device can still be constructed, as before. It can, for example, be adjusted manually (or also after a corresponding command on a display device or similar, if applicable) or an automated control process can also be performed, by a data processing unit (controller) for example. In this case, the adjustment process (manual/automatic) may take place in any manner, and as required, on a substantially continuous basis (within certain boundaries), or also in increments (only two angle positions in extreme cases).

If there are more than two radiation detection devices (in some cases simply referred to in simplified terms as a "detection device" or as a "detector device"), the adjustment mechanism is preferably designed such that all angle variations can be implemented by a single adjustment process. As a result, user-friendliness and also measurement speed can be increased. In some cases, it is also possible for at least many of the angle variations to be performed by separate handling operations. On the one hand, this is conceivable to avoid particularly complex structures, for example, but on the other hand it is conceivable as a fallback position of "simultaneous adjustability" if the corresponding mechanism were to display a defect when used in the field, for example. In such a case, this would admittedly lead to impaired operation; however, the device can continue to be operated with its functional scope more or less intact with regard to the end result. This kind of functionality may prove to be particularly advantageous, especially in the event of accidents and disasters.

Furthermore, it is proposed that the direction determination device should be designed such that exactly two symmetry-maintaining angle-dependent radiation detection devices and/or exactly one or two symmetry-breaking angle-dependent radiation detection devices are provided, particularly per detection plane. Initial tests have shown that such a structure can represent a particularly good compromise between the (relevant) device properties that are often required. In particular, the exactly two symmetry-maintaining angle-dependent radiation detection devices are already able to provide very accurate directional information with very low material costs and typically with minimum weight and/or energy consumption at the same time. The presence of one or two symmetry-breaking angle-dependent radiation detection devices makes it possible to resolve the remaining ambiguities as a result of the symmetry-maintaining angle-dependent radiation detection device(s), provided that these are relevant for the corresponding measurement task. In this case, the angle dependence of the symmetry-breaking angle-dependent radiation detection device(s) can be used to achieve additional accuracy of directional information (even though the symmetry-breaking angle-dependent radiation detection device does not necessarily need to have the same depth of information regarding angle dependence as the symmetry-maintaining angle-dependent radiation detection devices—although it can, of course, provide such information too).

Purely for the sake of completeness, it should be noted that, of course, different numbers of radiation detection devices are also possible (including for each detection plane), such as, for example, three, four, five, six, seven, eight, nine or ten symmetry-maintaining angle-dependent radiation detection devices and/or three, four, five, six, seven or eight symmetry-breaking angle-dependent radiation detection devices (in particular for each detection plane). In this case, a detection plane can be understood to mean that only one result is possible concerning the position of the radiation source with regard to an azimuth angle, for example (positioning along a line perpendicular to the horizontal surface or similar). Thus, for example, it is possible to establish the direction of the radiation source, but not the height of said source (at least not directly and/or without moving (translationally and/or rotationally) the measurement device and/or without considering the (total) counting rates of the detector devices). This depth of information is as already mentioned completely adequate for many measurements tasks, with the result that a single detection plane "for information" (including only one partial symmetry break in different directions within the detection plane) may prove to be sufficient.

Furthermore, depending on the requirements profile, one or two symmetry-breaking angle-dependent radiation detection devices may be provided (per detection plane). If a symmetry-breaking angle-dependent radiation detection device on one "horizontal detection plane" is present, this is only able (without moving the detection device or parts thereof) to provide information regarding the position "to the left or right of the device", for example, whereas "front-back" information is not possible. However, for many measurement tasks this may be fully adequate, as, for example, when releasing cleared areas that were previously "used for radioactive purposes", it can be assumed that the user of the measurement device will be entering the area to be checked from a "clean area". In regulatory tasks in connection with customs controls, for example, it can also be assumed that any radioactive sources that may be present will always be in front of the measurement device (because the containers, vehicles, cases and similar items are only positioned in this location). Furthermore, however, it is also possible to provide an individual symmetry-breaking angle-dependent radiation detection device (in particular for each detection plane) and to position this such that it can rotate, as this also makes it possible to resolve ambiguities. This can be manual and/or automatic.

In addition, for the sake of completeness, it should be noted that the results obtained typically only apply if the direction determination device (or parts thereof) is located in a specific position, in which the "corresponding position" is obvious to a person skilled in the art. It should also be noted that a total of three symmetry-breaking (symmetry-breaking variable-angle) detection devices are typically sufficient for a "complete three-dimensional symmetry break". In one case in particular, in which at least two symmetry-maintaining angle-dependent detection devices and at least one symmetry-breaking angle-dependent detection device are present, it should be noted that the relevant detection devices (also for each detection plane) do not necessarily need to display angle dependence in the same direction. In the case of symmetry-breaking angle-dependent detection devices with a corresponding design and configuration, this can be an advantage as left-right and front-back symmetry breaks are possible at the same time, for example. In such cases, angle dependence often distinguishes between top and bottom, which can also be advantageous information (also if a symmetry break is not required in this case). Of course, it is also possible for angle dependence of the symmetry-breaking angle-dependent detection device to "supplement" the angle dependence of the symmetry-maintaining angle-dependent detection devices (or in other words, at least partially be "in the same direction"), which typically leads to increased measurement accuracy of the angle information.

It is also proposed that least two symmetry-maintaining angle-dependent radiation detection devices should be arranged symmetrically, particularly mirror-symmetrically and/or axis-symmetrically and/or point-symmetrically, with respect to at least one symmetry-breaking angle-dependent radiation detection device in the direction determination device. With this kind of positioning, the symmetry break typically occurs in a "particularly suitable direction" (for example, right-left), typically and at the same time advantageously increasing measurement accuracy of angle determination and/or with a particularly simple mechanical structure.

It is also proposed that the symmetry-breaking angle-dependent radiation detection device in the direction determination device should be designed as an arrangement of detection volumes configured such that they are arranged longitudinally parallel to one another, and in particular two or four detection volumes configured such that they are arranged longitudinally parallel to one another, in the direction determination device, said detection volumes in particular being separated from one another in terms of radiation by at least one shielding device. Such a structure typically leads to particularly high quality of information with regard to symmetry breaks and/or with regard to improving the accuracy of direction determination. In particular, it is possible to lay the longitudinally configured direction volumes (for example scintillation crystals) on top of one another in the form of a "sandwich." When using corresponding materials (particularly high-density scintillator materials with a comparatively high attenuating effect on the ionizing radiation to be detected), it is often possible to dispense with a separate shielding device (for example a lead sheet which is arranged between the scintillation crystals), as the counting rates in the portions can be distinguished from one another to an adequate extent. If this requirement does not apply (but also otherwise), a shielding device can of course be provided to create or further increase the above-mentioned difference between the counting rates. In this case, "separated with regard to radiation" does not necessarily mean a more or less "perfect" separation. Instead, it is usually sufficient if the respective counting rates differ from each other sufficiently so that these can be (meaningfully) reused and/or analyzed to obtain meaningful information. It should be noted that it is not realistically possible to achieve a "more or less perfect" separation, especially with many types of ionizing radiation (particularly gamma radiation) due to the intrinsic properties of the radiation. Despite the radiation separation present in some cases, it is usually preferable if the components in question form a mechanical unit (assembly). As already explained above, an appropriately designed device comprising four longitudinally configured detection volumes arranged parallel to one another (especially if these can be joined to form a "kind of square" and/or can be arranged "with respect to one another to form a cross") can in particular permit symmetry-breaking measurements in two different directions (especially if these two directions are perpendicular to one another), with the result that these can be regarded as one, but also as two "symmetry-breaking angle-dependent radiation detection device/s" as defined in the present application in line with the definition of a "symmetry-breaking angle-dependent radiation detection device".

It is also proposed that the radiation detection devices and/or the longitudinally configured detection volumes in the direction determination device include a scintillator material which preferably has a length-to-width ratio of at least 5:1, preferably 10:1, particularly preferably 15:1 and even more preferably 20:1. Other ratios are of course also possible, such as, for example, 2:1, 3:1, 4:1, 5:1, 6:1, 7:1, 8:1, 9:1, 10:1, 11:1, 12:1, 13:1, 14:1, 15:1, 16:1, 17:1, 18:1, 19:1, 20:1, 25:1, 30:1, 35:1 or 40:1 (wherein the specified values may respectively be regarded as an upper limit and/or a lower limit for an open or closed interval). All known scintillator materials such as, for example, CsI (cesium iodide), NaI (sodium iodide), CeBr (cerium bromide), LaBr (lanthanum bromide), LSO (lutetium strontium oxide), plastics scintillator materials (which are particularly suited to high counting rates) or similar (where suitable doping agents may also be used in some cases) are generally suitable for use as scintillator materials. The materials used are particularly dependent on the kind of ionizing radiation to be detected. Gamma radiation and neutron radiation are particularly relevant in this context. "Optimization" to other forms of ionizing radiation, such as proton radiation, electron radiation, positron radiation and the like, is of course also conceivable.

It is also proposed that at least one radiation detection device include a measuring device, preferably a self-amplifying measuring device, particularly a photomultiplication device, which is in particular designed to be non-spatially resolved. Depending on the radiation to be amplified, other devices may also be used instead of photomultipliers (SEM—secondary electron multiplier; photons are detected with self-amplification), especially devices that amplify the other particles to be detected (for example electrons—Channeltron and the like). Such measuring devices are particularly suitable in connection with scintillator materials so as to amplify measurement signals, which are often low at the outset, or otherwise with a view to amplifying said signals even further by "electrical means" and/or to transmit said signals to a data processing unit. One advantage of a non-spatially resolved embodiment of the corresponding measuring device is that it is typically designed more simply and is therefore also more economical. Furthermore, there may also be advantages with regard to measurement accuracy, measurement sensitivity, the maximum achievable measurement rate, weight, cost and measurement speed (meaning that results can be evaluated more quickly). Of course, it is possible to also use spatially resolved measuring devices in addition or alternatively (especially in some and/or one type of the detector devices used (in particular for symmetry-breaking angle-dependent measuring devices)).

It is also proposed that the direction determination device include at least one data processor, which is designed and installed such that it is configured to determine the direction of the radiation source by comparing the measured values from the radiation detection devices, particularly their counting rates, preferably using measured values from a defined energy interval. Background noise can be (partially) advantageously "subtracted" or reduced as a result. This can manifest itself in increased measurement accuracy and/or quicker directional measurements. In this process, the measured values can be distinguished on the basis of energy in any manner, for example by selecting the detection materials used accordingly (especially if the type of radiation source to be detected is known), by adjusting any amplification devices and/or by using energy resolution data obtained "in a first stage" (especially in connection with the embodiment proposed at the outset). This is often referred to as "energy gating". In other words, preferably as a function of an initial analysis of the measured values obtained, only a specific "energy window" is used (allowed) for further measurements, especially if a direction is to be determined. The "energy windows" in this case are expediently "customized to the energy of the radiation source". The "real counting pulses" in such "energy windows" usually have a proportionally higher counting rate compared to background radiation than in other energy ranges. As a result, the proportion of background radiation is lower in relative terms (usually significantly lower).

In addition, or alternatively, it is also possible to design the direction determination device such that it includes at least one data processor, which is designed and installed such that it is configured to determine the material of the radiation source and in particular does this separately from and/or in addition to determining the direction by determining an energy distribution for at least some of the measured values obtained. The data processor may be the same as described previously. Accordingly, an energy resolution may be provided in some detector devices (or even in all detector devices). In particular, it is possible, with the aid of an energy-resolved measurement, to record spectra that also provide information on the type of radiation source in some cases (for example, conclusions can be drawn as to the material present by comparing with saved spectroscopic data). It is entirely possible for the relevant spectroscopic results to be available after a time which is different to the direction determination (later, in particular). However, this is not necessarily a disadvantage, as a complete "measurement campaign" to locate a radiation source typically takes longer than an individual operation purely to determine the direction. Thus, for example, it is often necessary to reposition the detector device within the direction determination device, reposition the direction determination device (rotate, move it towards the radiation source), the time required to plot the signal, and the like. However, within the "total time required" in such a case (often in a comparatively small portion of this time), spectroscopic data is usually available and can be displayed accordingly.

The data processor can also be configured to perform other tasks in addition to or as an alternative to the proposed tasks, such as, for example, establishing a direction, issuing a displayed value, saving and issuing measured values (for example, for drawing up a map and/or displaying a map, or for transmitting the resulting data by radio to a different location, and similar tasks. It can also automatically change the angle of the detection devices, etc., for example (relative to one another or relative to the radiation source, for example). Interfaces with other electronic components can also be created via this unit.

A method for determining the direction of a radiation source of ionizing radiation relative to a direction determination device is also proposed, in which the direction of the radiation source is determined from the measured values from at least two angle-dependent recording detector devices arranged at an angle to one another, especially from their counting rates. A direction determination device of the type proposed at the outset may in particular be used for the proposed method. By using the proposed method it is possible to produce the same properties and advantages as the device proposed at the outset, in at least a similar manner. The method can also be developed as defined in the above description, resulting in the above-mentioned advantages and properties in at least a similar manner.

FIG. 1 shows a first embodiment of a direction detector 1 in a schematic top view from above. The direction detector 1 has a particularly simple design, leading among other things to a low weight and low power consumption. It is therefore also particularly suitable for portable applications.

The basic design of the direction detector 1 comprises a symmetrically-detecting detector 2 (symmetry-maintaining angle-dependent radiation detection device) and a symmetry-breaking detecting detector 3 (symmetry-breaking angle-dependent radiation detection device).

In this case, the symmetrically-detecting detector 2 substantially consists of a longitudinally shaped scintillation crystal 4, such as, for example, a CsI scintillation crystal (cesium iodide scintillation crystal). A photomultiplier 5 (also known as a secondary electron multiplier) is in each case also arranged on one side of the scintillation crystals 4, said photomultiplier being designed to be non spatially-resolved and non-energy-resolved in this particular case. The pulses measured by the photomultipliers 5 are sent to a controller 6, which evaluates the measured data and shows the evaluated data on a display 7 (described in greater detail below). Data cables 8 are used to transmit the necessary pulses and these also, inter alia, guarantee the power supply to the relevant components (although this is not shown in greater detail).

For the sake of completeness, it should be noted that the symmetrically-detecting detector 2 measures asymmetrically (symmetry-breaking) to a certain extent as a result of the photomultiplier 5 only being arranged on one side and due to the resulting attenuation. However, as only very few counting pulses are recorded in the longitudinal direction of the scintillation crystal in any event, this effect is comparatively small. This is particularly applicable with regard to "actual angle dependence", in other words the angle of rotation relative to the front face (the arrow marked as "V" in FIG. 1), which is facing the operator 9, who is shown schematically. It should be noted that the operator 9 may in some cases be omitted or may be located in a completely different location in some cases (for example, if used on a stationary basis, in an independent vehicle or similar).

Gamma radiation (in this case) is actually detected by the incident gamma radiation causing flashes of light in the symmetrically-detecting detector 2, which are received by the photomultiplier 5 and converted to an amplified electrical signal which is sent to the controller 6 via the data cable 8. In the position illustrated in FIG. 1, a maximum counting intensity of the symmetrically-detecting detector 2 is achieved if the gamma radiation source is located in the (exact) region of the front face of the direction detector 1. If, however, the gamma radiation source is located (exactly) to the right or left of the direction detector 1, a minimum counting rate is obtained. The signal is correspondingly higher or lower for "angles in between". This signal may also be overlaid by background radiation.

A symmetry-breaking detecting detector 3 is also provided in FIG. 1, which is arranged such that it is offset by 90° to the symmetrically-detecting detector 2. Both detectors, in other words the symmetrically-detecting detector 2 and the symmetry-breaking detecting detector 3, are arranged horizontal to the ground surface.

The symmetry-breaking detecting detector 3 may be substantially regarded as a module comprising two symmetrically-detecting detectors 2 arranged adjacent to one another (in a mechanically compact design). In other words, two scintillation crystals 4 are placed on top of one another on one of its longitudinal sides 11 ("sandwich structure"). Both scintillation crystals 4 each also comprise a photomultiplier 5 to amplify the light pulses generated in said crystals. As a general rule, both individual scintillation crystals 4 would provide identical counting rates when rotated to the left or to the right (relative to the direction of the arrow V) for the same angles (provided that the gamma source is located in the direction of arrow V). However, the radiation reaching a scintillation crystal 4 located on the lee (distal) side of the radiation source is attenuated by the other adjacent scintillation crystal 4 located on the upwind (proximal) side, with the result that it displays a slightly lower counting rate. The strength of this effect is dependent on density, size and the material from which the scintillation crystal 4 is made. To increase the difference in the counting rates, a thin layer of a radiation-absorbing material 12 is also arranged in the embodiment shown. This may, for example, be a thin sheet of lead, or similar. A further advantage of such a radiation-absorbing material 12 is that it typically also prevents counting pulses (light pulses) from a scintillation crystal 4 being transferred to the adjacent scintillation crystal 4.

Due to the overall symmetry-breaking effect of the symmetry-breaking detecting detector 3, the controller 6 is in this case able to distinguish whether a radiation source is located to the left or right of the direction detector 1. Depending on the angle to the longitudinal axis of the symmetry-breaking detecting detector 3, the counting rate in the relevant scintillation crystals 4 will also be different (the same applies to the symmetrically-detecting detector 2).

The controller 6 can now use the ratio between the two counting rates from the total of three scintillation crystals 4 or photomultipliers 5 in this instance to establish the angular position in which a radiation source is located, whether the radiation source is located to the left or right of the direction detector 1 and may also deduce the intensity of the radiation source. As background radiation affects all scintillation crystals 4 equally, at least as a statistical average, the effect of background radiation can simply be "omitted from the calculations", which is correspondingly advantageous.

According to a modification of the arrangement illustrated in FIG. 1, it is also possible for the photomultipliers 5 to detect on a selective energy basis: as a result, it is possible for the resulting measurement signals to be "gated". In other words, depending on the identified radiation source, if applicable, the energy spectrum emitted by said source can be detected (in general terms) (in this process, the entire spectrum does not need to be recorded; it is usually merely sufficient to consider the strongest pulse(s), irrespective of whether these already indicate the type of material emitting the radiation, or otherwise, and if the energy ranges with an increased counting rate are merely considered by the controller 6 when determining the direction by way of example). As a result, it is usually possible to reduce the interference effects resulting from background radiation, thus further increasing the quality of direction determination.

However, in addition or alternatively, it is also possible to utilize energy-resolved detection of measurement signals to establish the spectrum of the source emitting the radiation and thus deduce the material emitting the radiation. In this case, it is also entirely possible to identify the direction (including the described gating process) and to identify the material at significantly different times.

It is also entirely conceivable for the angle between the two detectors 2, 3 (symmetrically-detecting detector 2 or symmetry-breaking detecting detector 3) to be designed as a variable angle, this being described in greater detail in the following embodiment.

In addition, the application states that it is not possible to establish whether the radiation source is located in front of or behind the direction detector 1 using the direction detector 1 illustrated in this case. It is also not possible to state whether the radiation source is located above or beneath the plane spanned by the detectors 2, 3. However, for many measurement tasks, this is not a disadvantage, as it can usually be assumed that an operator 9 will enter a "critical area" from a "clean area" and it can also be assumed that a radiation source will not be "floating in space" (although the situation may be different in buildings). Moreover, it is possible, by programming the controller 6 accordingly, for example, to even resolve these uncertainties if the operator, for example, rotates the direction detector 1 in different directions by following corresponding instructions via the display 7 or if this happens automatically. If, for example, the direction detector 1 is rotated through 90° in the plane of projection, it is possible to establish whether a radiation source is located in front of or behind the direction detector 1 (although in this case it is no longer possible to establish whether the radiation source is arranged to the left or right of the direction detector 1). However, the controller 6 can "note" this information so as to provide a "complete set of information" at the end of the process. Accordingly, "top-bottom" information can be obtained by rotating the direction detector 1 around an axis along the longitudinal axis of the symmetry-breaking detecting detector 3.

Figure 2:
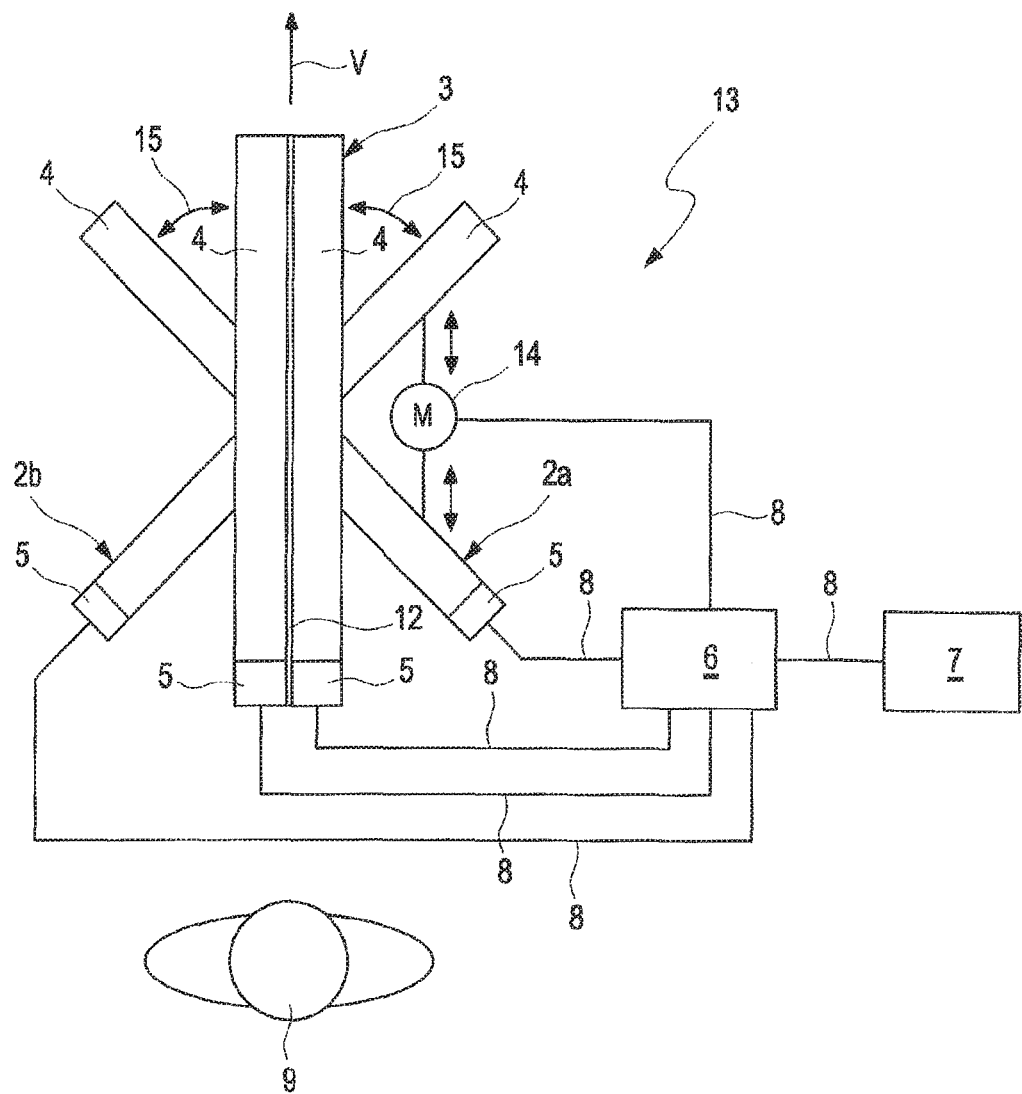
FIG. 2 is a schematic top view of a second embodiment of a direction detector for a gamma source.

FIG. 2 shows a second preferred embodiment of a direction detector 13, for which an initial demonstrator has already been constructed to perform internal tests and is operating well. In the second embodiment of a direction detector 13, a symmetry-breaking detecting detector 3 is illustrated parallel to the longitudinal axis of the direction detector 13 (parallel to the arrow "V" pointing in the direction of the front face)—as in the direction detector 1 illustrated in FIG. 1—said symmetry-breaking detecting detector having a substantially identical design to the symmetry-breaking detecting detector 3 described above.

However, the present direction detector 13 has two symmetrically-detecting detectors 2a, 2b, which are arranged in an initial position (as shown in FIG. 2) at a 90° angle to one another. The symmetrically-detecting detectors 2a, 2b are each (in an initial position) arranged at an angle of 45° in relation to the symmetry-breaking detecting detector 3. The design of the symmetrically-detecting detectors 2a, 2b is similar to that of the symmetrically-detecting detector 2 according to the first embodiment of a direction detector 1 (FIG. 1).

The controller 6 can once again be used to deduce the position of a gamma emitter on the basis of the different counting rates in the individual detectors 2a, 2b, 3. This relates to the angular position, giving an indication of whether the gamma emitter is located to the left or right of the direction detector 13, but not in itself providing any further information as to whether the gamma emitter is in front of or behind or above or below the direction detector 13. As already mentioned, however, this can be resolved by rotating the device 13 accordingly.

As a result of the higher number of counting pulses in total (due to the higher number of detectors), the measurement is already more accurate ab initio than in the embodiment according to FIG. 1.

Furthermore, in the embodiment of a direction detector 13 illustrated in this case, it is also possible to adjust the angle of the two symmetrically-detecting detectors 2a, 2b with respect to one another (the symmetrically-detecting detector preferably being adjusted to the symmetry-breaking detector 3). In the embodiment illustrated in this case, a servomotor 14 is automatically controlled by the controller 6 for this purpose. Of course, "manual adjustment" is also possible, for example, following a corresponding request in the display 7. If necessary, a sensor can also monitor the correct position of the corresponding detectors 2a, 2b (also 3 if applicable).

It is possible to enlarge the field of vision of the direction detector 13 by the adjustment process (although this will be at the expense of relative resolution). On the other hand, however, it is also possible to increase the relative resolution of the direction detector 13 (although likewise at the expense of the field of vision). Table 1 provides an overview of the increased accuracy that can be achieved as a result. This table shows a numerical simulation of the field of vision and the relative resolution as a function of the angle 15 between the relevant symmetrically-detecting detector elements 2a, 2b and the symmetry-breaking detecting detector element 3.

TABLE 1

| Angle [degrees] | | Field of vision | Rel. resolution |
| --- | --- | --- | --- |
| 2a | 2b | [degrees] | [pulses/degrees] |
| −20 | +20 | 40 | 55 |
| −30 | +30 | 60 | 48.3 |
| −45 | +45 | 90 | 40 |
| −60 | +60 | 180 | 32.5 |

The demonstrator used CsI scintillation crystals 4 which were 10 cm long with a (square) end face 10 measuring 1.8 cm×1.8 cm. The overall dimensions of the device were approximately 35×35×35 cm$^3$ and it weighed approximately 5 kg (including the high-performance battery), which shows that the device can certainly be used as a portable device. In the case of non-shielded radiation sources with—a relatively low source—intensity of 150 MBq, the time taken to detect that a radiation source was present was less than 1 second at a distance of approximately 20 m from the radiation source; it was typically possible to determine the direction in less than 10 seconds. With a non-shielded radiation source with a source intensity of 1 MBq and a distance of 3 m, the time taken to detect that a radiation source was present was also less than 1 second; once again, it was typically possible to determine the direction in less than 10 seconds. In both cases, it typically took approximately 30 to 60 seconds to identify a material (by spectral analysis). The direction resolution was approximately +/−3°.

When a radiation source of approximately 180 kBq was used on an experimental basis, it was still possible to determine the direction (although it took longer, typically in the region of approximately 1 minute). For comparison purposes, a 180 kBq radiation source at a distance of 3 m has approximately the same radiation level as background radioactivity in Germany. The tests indicate that the device proposed in this application is suitable for gamma sources with energy levels from approximately 30 keV.

Figure 4:
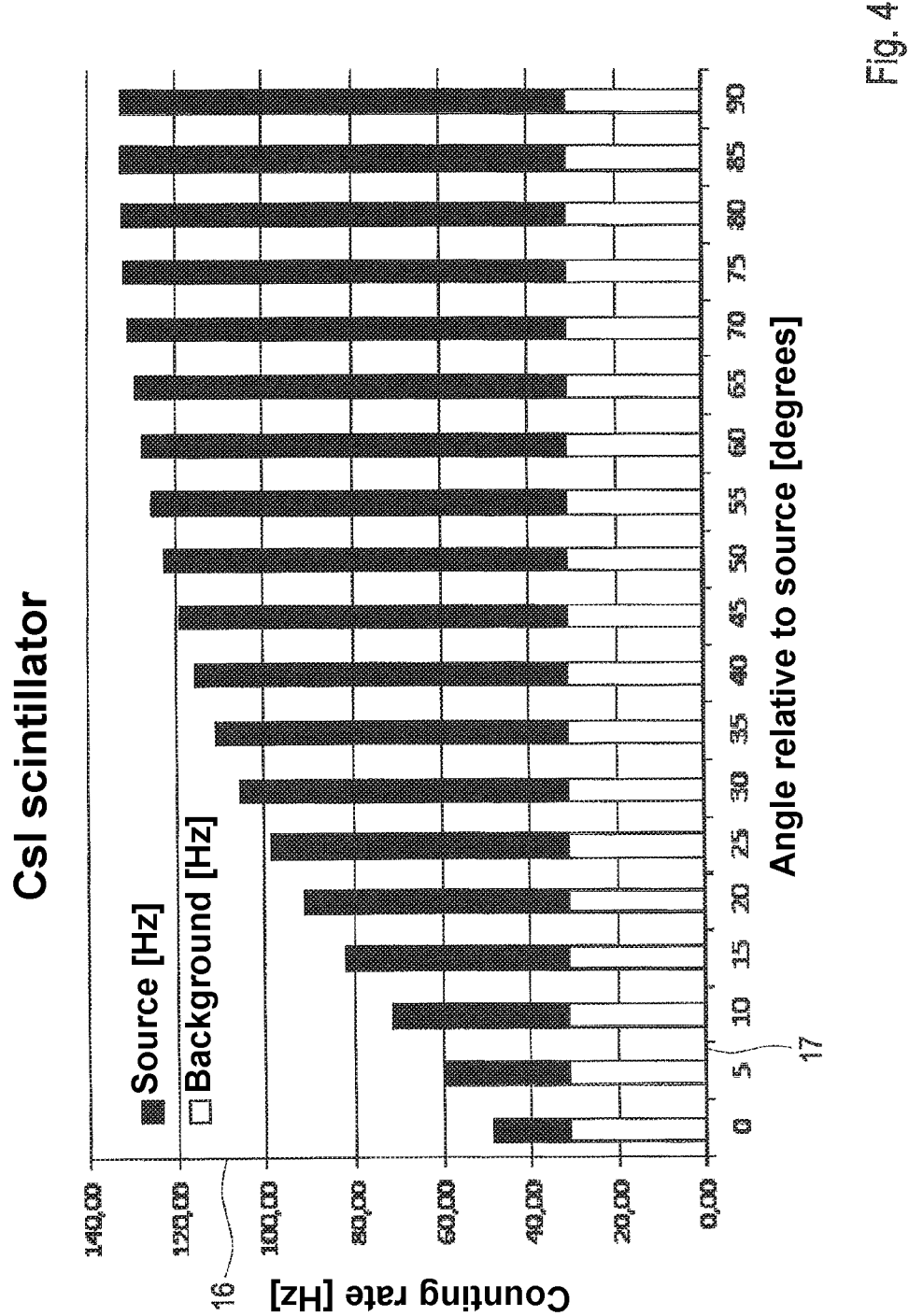
FIG. 4 is an example of a histogram showing angle-dependence of counting rate for an angle-dependent detector as a function of its orientation with regard to a radiation source in the presence of background radiation.

To clarify the characteristics of the described direction detectors 1, 13 (and other additional designs), FIG. 4 shows the "reception characteristic" of an individual symmetrically-measuring scintillation crystal 4 or a symmetrically-detecting detector 2. As a function of the angle (in this case, 0° means that the end face 10 of the scintillation crystal 4 is pointing directly at the radiation source), the counting rate in Hertz is shown on the ordinate 16 as a function of the various angles (plotted along the abscissa 17). The respective histogram is broken down into the counting rate due to the source and the counting rate due to background radiation. Background radiation is (naturally) not dependent on the angle, whereas the counting rate based on the radiation source varies considerably as a function of the angle.

Figure 5:
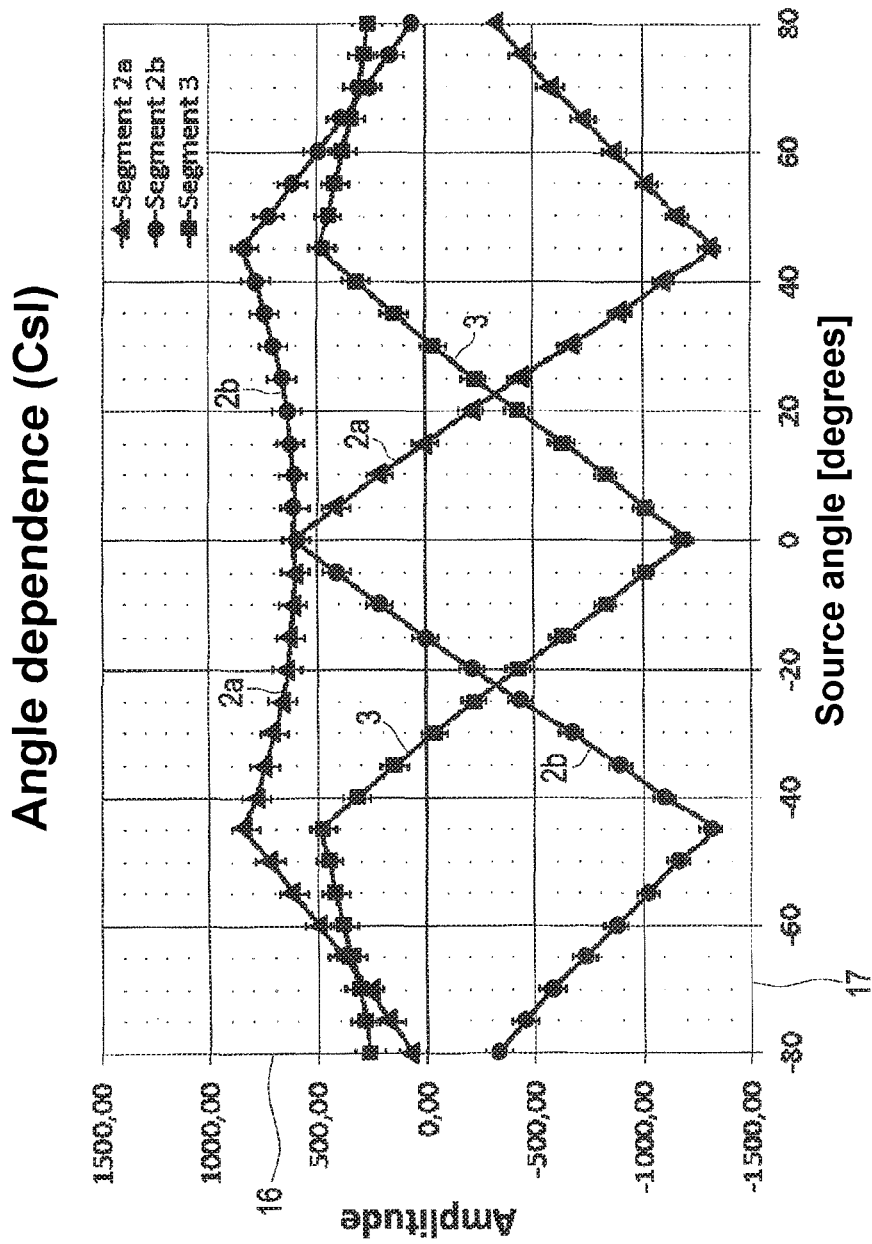
FIG. 5 depicts counting rates for various detectors for the embodiment of the direction detector illustrated in FIG. 2.

FIG. 5 also shows the relative amplitude (in any units) of the relevant detectors 2a, 2b, 3 (plotted along the ordinate 16) as a function of the respective angle (plotted along the abscissa 17) for comparison purposes (wherein the detectors 2a, 2b, 3 are each shown separately). The arrangement of the direction detector illustrated in FIG. 2 forms the basis for this diagram. In order to simplify the simulation, calculations were performed using a symmetrically-detecting detector (of type 2, 2a or 2b) instead of using a symmetry-breaking detecting detector 3. As a result, (in theory) this corresponds substantially to using a symmetry-breaking detecting detector 3 in which the total counting rate is shown (in other words there is no "breakdown" into "left detector half" and "right detector half").

FIG. 3 further illustrates different versions of symmetry-breaking detecting detectors, shown in a schematic perspective arrangement in each case. FIG. 3a shows the symmetry-breaking detecting detector 3 which is also used in the embodiments shown in FIG. 1 and FIG. 2. This comprises two scintillation crystals 4 which are separated from each other in terms of radiation (by inserting a radiation-absorbing material 12 if applicable). Of course, it is also possible to design a symmetry-breaking detecting detector 18 by using four scintillation crystals 4 which are separated from each other in terms of radiation (by inserting a radiation-absorbing material 12 between each crystal, if applicable)—as shown in FIG. 3b. Additional information concerning the position of the radiation source can be obtained as a result. Especially when using a symmetry-breaking detecting detector 18, it is also possible to have an arrangement in which the symmetry-breaking detecting detector 18 "stands perpendicular to the measurement plane", as this provides simultaneous information on the front-back and left-right position (but not above-below).

For the sake of clarification, it should also be mentioned that the individual scintillation crystals 4 of the symmetry-breaking detecting detectors 3, 18 (and other versions) are admittedly separated from each other in terms of radiation, but in general form a compact mechanical unit. Furthermore, it is also possible for the symmetry-breaking detecting detectors 3 to be shorter, in terms of their length, than the symmetrically-detecting detectors 2. This may also only apply to some of the scintillation crystals 4 installed in a symmetry-breaking detecting detector 3. As a result, "these can concentrate" on the "assigned" task of breaking symmetry. Such a design can save on weight and space and in some cases may also reduce energy consumption. Moreover, in extreme cases, it is also possible that the symmetry-breaking detecting detector elements 3, 18 may display no further "reasonably usable" angle dependence and may be (substantially) exclusively used for "symmetry breaking".

Figure 6:
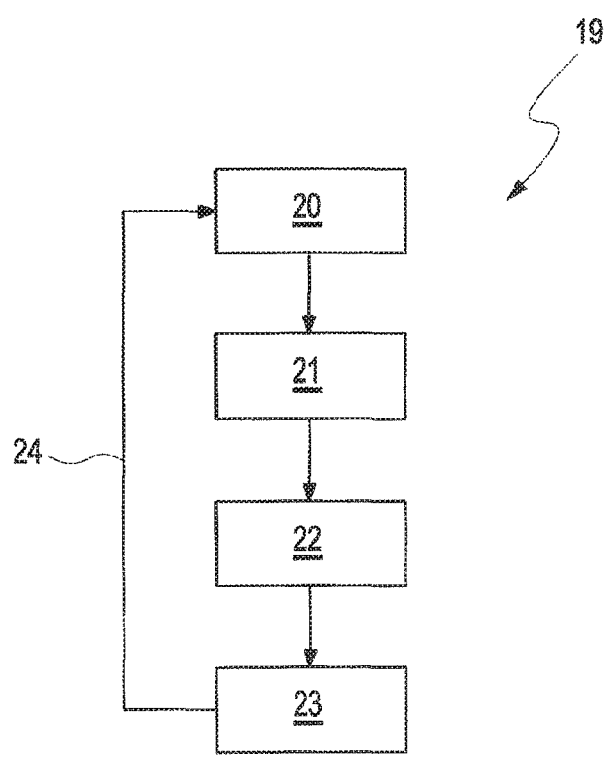
FIG. 6 depicts a schematic representation of a method for determining the position of a radiation source.

Finally, FIG. 6 also portrays a method for determining the direction of a radiation source of ionizing radiation by means of a flowchart 19. In a first step 20, the counting rates of the different detectors (especially symmetrically-detecting detectors 2, 2a, 2b and symmetry-breaking detecting detectors 3) are measured. In a subsequent step 21, based on the individual measurement results, background radiation is then "subtracted" and the direction of the radiation source is established from the remaining "improved" measurement data (also including energy gating and/or spectroscopic analysis in parallel). The available results are then shown in a display step 22 (for example displayed on a display 7 or issued by means of data interfaces). The display step 22 can (optionally) also be supplemented by an optimization step 23. In this optimization step 23, the user may, for example, be asked to perform specific actions, such as, for example, rotating the device. He may also be asked to change the angular position of individual detectors (for example, symmetrically-detecting detectors 2a, 2b in the case of direction detector 13 according to the second embodiment) in order to increase measurement accuracy, for example. It is also possible for parts of this optimization to be automated and to be performed independently without user intervention. The method is then reset 24 so that another counting rate measurement 20 is performed. Especially if insufficient data has been collected, it is also possible to perform the optimization step 23 as an "empty method step" to a certain extent, and thus with no internal adjustment within the device and/or user commands issued.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS direction detector: 1
symmetrically-detecting detector: 2
symmetry-breaking detecting detector: 3
scintillation crystal: 4
photomultiplier: 5
controller: 6
display: 7
data cable: 8
operator: 9
end face: 10
longitudinal side: 11
radiation-absorbing material: 12
direction detection: 13
servomotor: 14
angle: 15
ordinate: 16
abscissa: 17
symmetry-breaking detecting detector: 18
flowchart: 19
counting rate measurement: 20
direction determination: 21
display step: 22
optimization step: 23
reset: 24

The invention claimed is:

1. A direction determination device for determining a direction of a source of ionizing radiation relative to the direction determination device, the direction determination device comprising:
   at least two radiation detection devices with longitudinally designed detection volumes, wherein the at least two radiation detection devices are arranged at an angle relative to one another,
   wherein a first of the radiation detection devices is a symmetry-maintaining angle-dependent radiation detection device, and
   wherein a second of the radiation detection devices is a symmetry-breaking angle-dependent radiation detection device.

2. The direction determination device according to claim 1, wherein the at least two radiation detection devices are arranged at variable angles relative to one another such that they can be manually and/or automatically adjusted.

3. The direction determination device according to claim 1, wherein the at least two radiation detection devices include exactly two symmetry-maintaining angle-dependent radiation detection devices and/or exactly one or two symmetry-breaking angle-dependent radiation detection devices per detection plane.

4. The direction determination device according to claim 1, wherein the at least two radiation detection devices include at least two symmetry-maintaining angle-dependent radiation detection devices arranged at least one of mirror-symmetrically, axisymmetrically, and point-symmetrically with respect to the symmetry-breaking angle-dependent radiation detection device.

5. The direction determination device according to claim 1, wherein the symmetry-breaking angle-dependent radiation detection device includes an arrangement of two or more detection volumes arranged longitudinally parallel to one another, and
   wherein the two or more detection volumes are separated from one another by at least one radiation shielding device.

6. The direction determination device according to claim 1, wherein the at least two radiation detection devices comprise a scintillator material having a length-to-width ratio of at least 5:1.

7. The direction determination device according to claim 1, wherein at least one of the at least two radiation detection devices comprises a photomultiplication device designed to be non-spatially resolved.

8. The direction determination device according to claim 1, wherein at least one of the at least two radiation detection devices is configured to be energy-resolved.

9. The direction determination device according to claim 8, further comprising at least one data processor configured to determine the direction of the radiation source by comparing counting rates measured by the at least two radiation detection devices using measured values from a defined energy interval.

10. The direction determination device according to claim 9, wherein the data processor is configured to determine the material of the radiation source separately to and/or in addition to determining the direction by determining an energy distribution for at least some measured values obtained.

11. The direction determination device of claim 1, further comprising a data processor configured to determine the direction of a source of ionizing radiation relative to the direction determination device by using a ratio of counting rates provided by the symmetry-maintaining angle-dependent radiation detection device and the symmetry-breaking angle-dependent radiation detection device.

12. A method for determining a direction of a radiation source of ionizing radiation with respect to a direction determination device, the method comprising:
determining a direction of a radiation source from counting rates measured by at least two angle-dependent recording detector devices arranged at an angle relative to one another,
wherein the at least two angle-dependent recording detector devices include longitudinally designed detection volumes,
wherein a first of the at least two angle-dependent recording detector devices is a symmetry-maintaining angle-dependent radiation detection device, and
wherein a second of the at least two angle-dependent recording detector devices is a symmetry-breaking angle-dependent radiation detection device.

13. A direction determination device for determining a direction of a source of ionizing radiation relative to the direction determination device, the direction determination device comprising:
a symmetry-maintaining angle-dependent radiation detection device comprising a longitudinally designed detection volume that includes a scintillator material having a length-to-width ratio of at least 5:1; and
a symmetry-breaking angle-dependent radiation detection device comprising a longitudinally designed detection volume,
wherein the symmetry-maintaining angle-dependent radiation detection device is arranged at an angle relative to the symmetry-breaking angle-dependent radiation detection device.

14. The direction determination device of claim 13, wherein the longitudinally designed detection volume of the symmetry-breaking angle-dependent radiation detection device includes a second scintillator material having a length-to-width ratio of at least 5:1.

15. The direction determination device of claim 13, wherein the symmetry-breaking angle-dependent radiation detection device includes an arrangement of two or more detection volumes arranged longitudinally parallel to one another, and
wherein the two or more detection volumes are separated from one another by at least one radiation shielding device.

16. The detection determination device of claim 1, wherein each of the symmetry-maintaining angle-dependent radiation detection device and the symmetry-breaking angle-dependent radiation detection device includes a free end and a measuring end,
wherein each measuring end includes a self-amplifying measuring device.

17. The detection determination device of claim 16, wherein the self-amplifying measuring device is at least one of the group consisting of a photomultiplier and a secondary electron multiplier.

18. The detection determination device of claim 13, further comprising a second symmetry-maintaining angle-dependent radiation detection device.

19. The detection determination device of claim 18, wherein the symmetry-maintaining angle-dependent radiation detection device and the second symmetry-maintaining angle-dependent radiation detection device are arranged, with respect to the symmetry-breaking angle-dependent radiation detection device, at least one of mirror-symmetrically, axisymmetrically, and point-symmetrically.

20. The detection determination device of claim 13, wherein the scintillator material has a length-to-width ratio of at least 10:1.

* * * * *